No. 720,839. PATENTED FEB. 17, 1903.
E. C. O'NEIL.
ATTACHMENT FOR HORSE BLANKETS.
APPLICATION FILED AUG. 5, 1902.

NO MODEL.

Witnesses,

Inventor,
Edward C. O'Neil
By Dewey Strong & Co
Attys

UNITED STATES PATENT OFFICE.

EDWARD C. O'NEIL, OF SAN FRANCISCO, CALIFORNIA.

ATTACHMENT FOR HORSE-BLANKETS.

SPECIFICATION forming part of Letters Patent No. 720,839, dated February 17, 1903.

Application filed August 5, 1902. Serial No. 118,458. (No model.)

*To all whom it may concern:*

Be it known that I, EDWARD C. O'NEIL, a citizen of the United States, residing in the city and county of San Francisco, State of California, have invented an Improvement in Attachments for Horse-Blankets; and I hereby declare the following to be a full, clear, and exact description of the same.

My invention relates to improvements in means for holding blankets in position upon horses. Its object is to provide a simple, durable, and adjustable securing device by which the blanket may be held down over a horse's rump to prevent the blanket being disarranged or blown off when the horse is exposed to winds or storms.

It comprises the construction and combination of parts hereinafter set forth, having reference to the accompanying drawings, in which—

Figure 1:
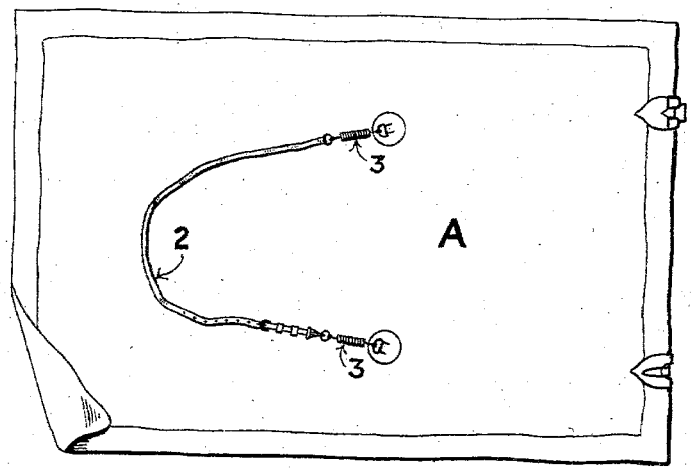
Figure 2:
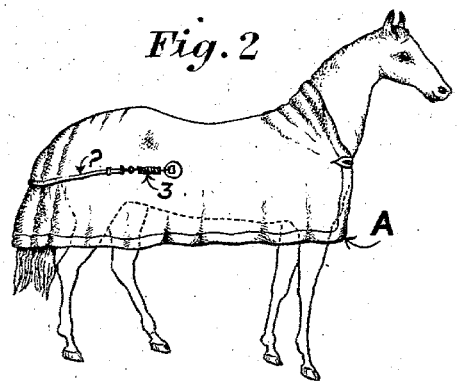
Figure 3:
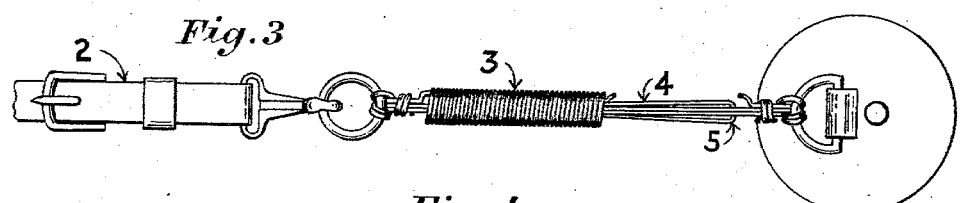
Figure 4:
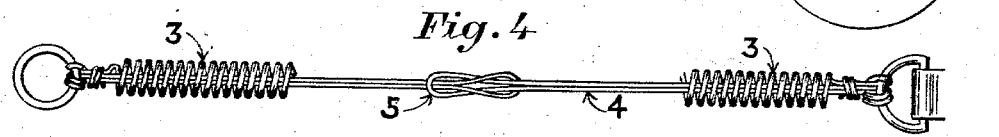

Figure 1 shows general view of blanket with storm-strap attached. Fig. 2 shows position of strap when blanket is on the horse. Fig. 3 shows spring with part removed to show guide-wires. Fig. 4 shows position of guide-wire loops when spring is extended, the spring being partly broken away.

A represents an ordinary horse-blanket laid over the animal's back in the usual manner and suitably secured around the horse's neck. Nearly central of the blanket at opposite points forward of the hips and adjacent to the horse's flanks are secured the ends of a strap 2, which is adapted to be passed over the animal's buttocks to hold the blanket in position.

The novelty in my invention resides particularly in the position of the points of attachment of the strap and means by which the strap ends are resiliently supported in order to allow the blanket to be quickly put on or taken from the horse and to accommodate for the natural movements of the horse while blanketed.

The securing means consist of coiled metal springs 3, each having one end fastened to a ring on the blanket and the other to a ring on the end of the strap. The springs are guided in their expansion and contraction and are limited in the extent of their expansion by means of the looped wires 4. There are two of these wires for each spring, and the wires of each pair are folded centrally to form an eye 5. Each wire is slidable in the eye of its corresponding member, as shown in Fig. 4, and the ends of these guide-wires project from either end of their respective springs and are secured to the rings on the strap and blanket, to which the spring ends attach. As each wire when so folded is approximately the length of the spring, the eye portions 5 of the wires in each spring will be at opposite ends of the spring when the latter is in normal contracted position, and it is obvious that the distance the ends of a spring may be separated is approximately twice the length of the spring. This allows for all necessary movements in adjusting the blanket and accommodates the blanket comfortably to the movements of the horse.

I am aware that elastic bands have been used to keep blankets in position; but they have been found objectionable, as they do not retain their elasticity for any length of time and soon become frayed and worn.

The springs are far more durable and satisfactory, and the use of the guide-wires prevents their becoming pulled out of shape.

The strap may be made adjustable in length and provided with a snap-hook, by which it can be quickly released from one of the springs, if desired, when the strap is to be passed beneath the reins, as when the horses are checked back.

It has been found by experience that the strap ends should be secured at points forward of the hips, as shown, as thereby the strap can be thrown back over the horse more easily. The same blanket, with its strap attachment, is adapted to horses of various sizes, and what is of the greatest importance is that the blanket is in the horseman's eyes is drawn tight around the horse from points well forward of and below the kidneys, so that no wind can penetrate beneath the blanket, and so chill the horse and possibly cause him to take cold.

The blanket is designed, primarily and essentially, as an outside or storm blanket and not as a stable-blanket.

Having thus described my invention, what I claim, and desire to secure by Letters Patent, is—

1. A blanket having a strap upon its outside intermediate of the ends of the blanket and having an elastic connection therewith, said strap adapted to be passed downwardly over the blanket and the animal's buttocks.

2. The combination with a blanket, of a strap on the outside thereof between the ends, and having its ends yieldingly connected to the blanket at opposite sides at points relatively forward of the horse's hips, said strap adapted to be passed downwardly over the blanket and the animal's buttocks.

In witness whereof I have hereunto set my hand.

EDWARD C. O'NEIL.

Witnesses:
S. H. NOURSE,
JESSIE C. BRODIE.